Figures 3, 4:
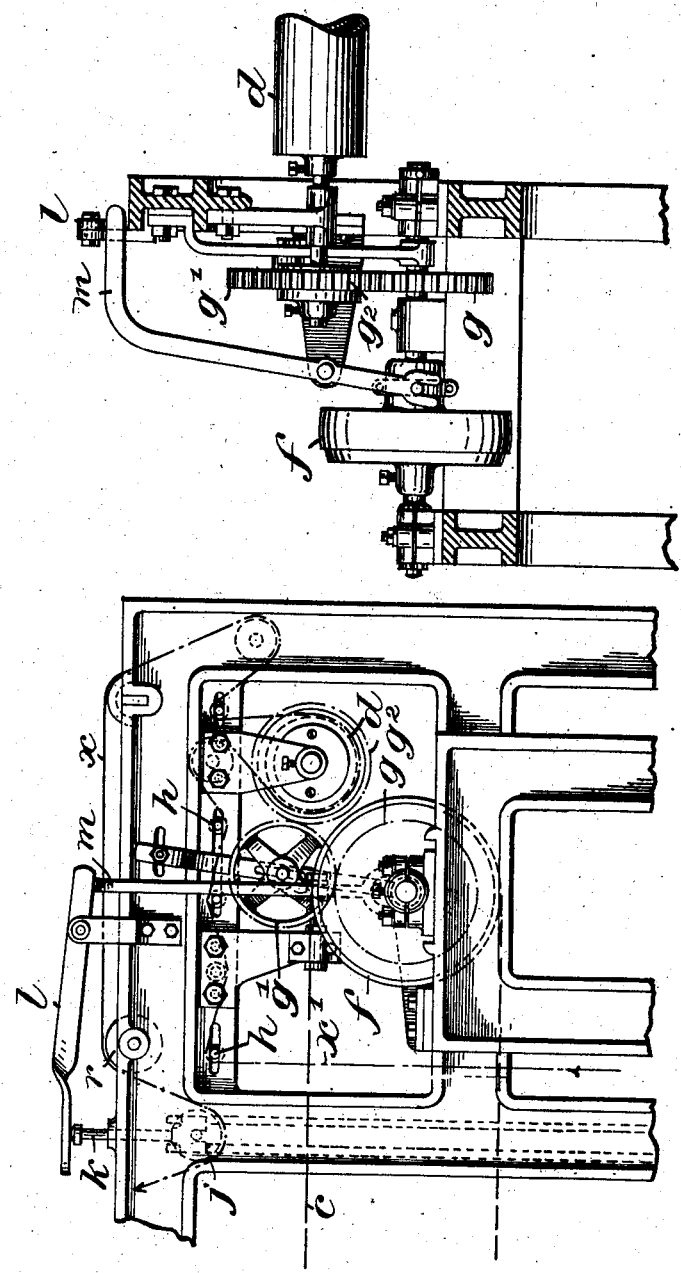

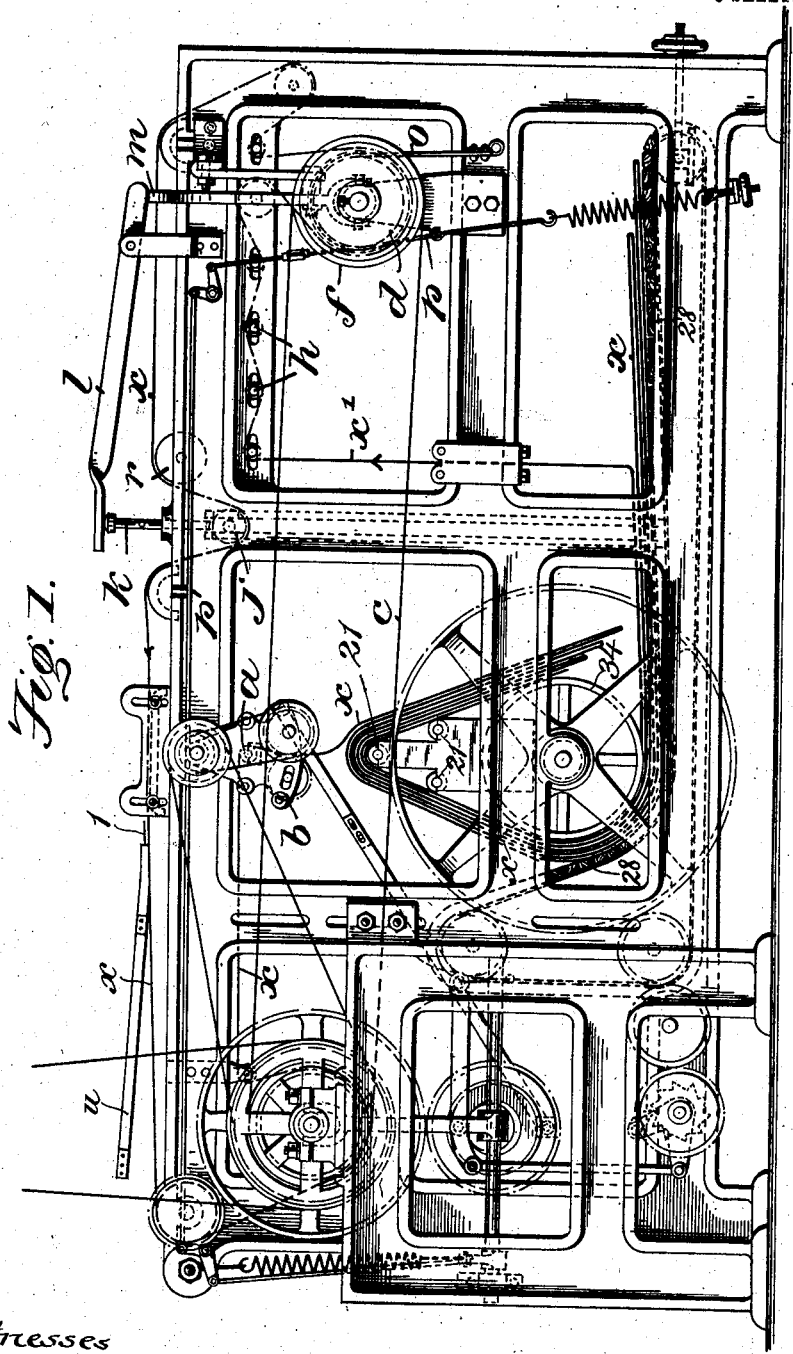

No. 827,430. PATENTED JULY 31, 1906.
O. DREY.
MACHINE FOR CUTTING WEFT PILE FABRICS.
APPLICATION FILED SEPT. 23, 1904.
5 SHEETS—SHEET 2.
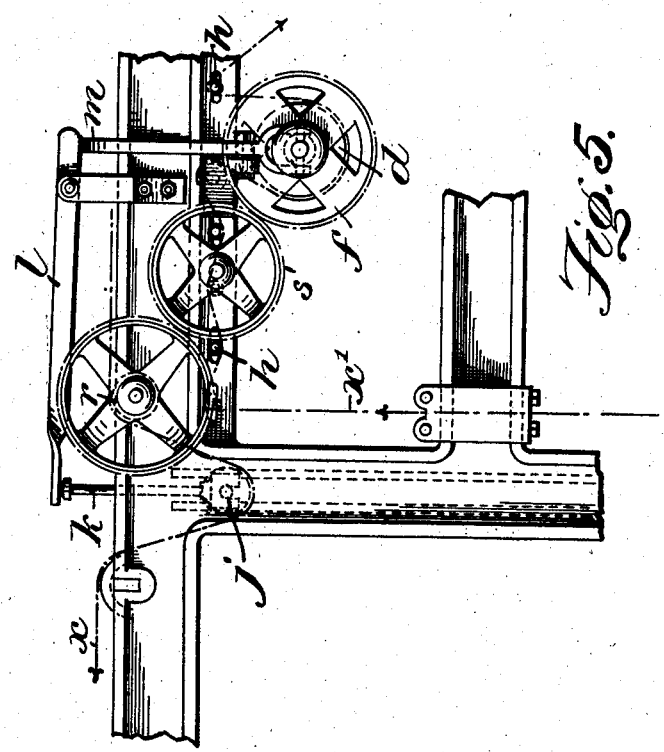
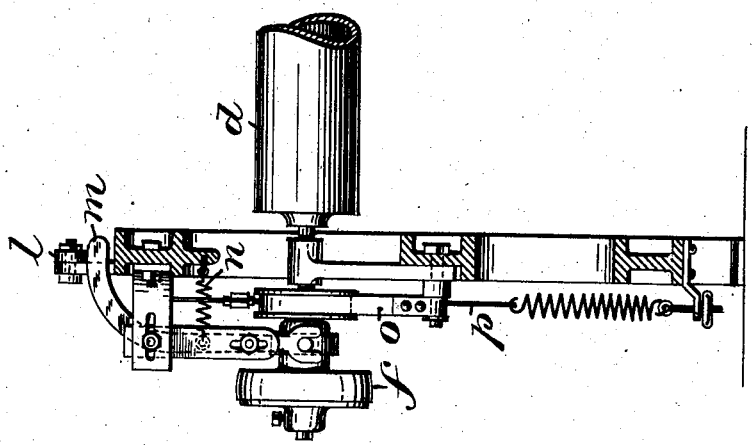
Witnesses:
Waldo M. Chapin
Frank S. Ober
Inventor
Oscar Drey
by
Rosenbaum & Stockbridge
att'ys No. 827,430.

PATENTED JULY 31, 1906.

O. DREY.

MACHINE FOR CUTTING WEFT PILE FABRICS.

APPLICATION FILED SEPT. 23, 1904.

5 SHEETS—SHEET 3.

Witnesses

Inventor

No. 827,430. PATENTED JULY 31, 1906.
O. DREY.
MACHINE FOR CUTTING WEFT PILE FABRICS.
APPLICATION FILED SEPT. 23, 1904.

5 SHEETS—SHEET 4.

Witnesses
Waldo M. Chapin
Stanley Ober

Inventor
Oscar Drey
by
Rosenbaum & Stockridge
attys.

No. 827,430. PATENTED JULY 31, 1906.
O. DREY.
MACHINE FOR CUTTING WEFT PILE FABRICS.
APPLICATION FILED SEPT. 23, 1904.

5 SHEETS—SHEET 5.

Witnesses:
Waldo M Chapin
Frank S Ober

Inventor
Oscar Drey
by
Rosenbaum & Stockbridge
attys

UNITED STATES PATENT OFFICE.

OSCAR DREY, OF SOUTH REDDISH, NEAR STOCKPORT, ENGLAND.

MACHINE FOR CUTTING WEFT PILE FABRICS.

No. 827,430. Specification of Letters Patent. Patented July 31, 1906.

Application filed September 23, 1904. Serial No. 225,567.

*To all whom it may concern:*

Be it known that I, OSCAR DREY, a subject of the King of Great Britain and Ireland, and a resident of South Reddish, near Stockport, England, have invented new and useful Improvements in and Relating to Machines and Appliances for Cutting Weft Pile Fabrics, of which the following is a specification.

These improvements relate to weft-pile-cutting machines, and principally to those in which the fabric is operated upon in an endless condition and in which the cloth at some point is disposed, arranged, or allowed to fall in folds, plaits, loops, or the like. One form of such a machine is described in the specification to British Letters Patent No. 8,906, granted to me and dated the 28th of April, 1899.

The chief object of this invention is to provide simple and efficient means for maintaining and effecting a steady tension in the fabric in its course through the machine and in the process of pile-cutting.

In the prior machine referred to the cloth is also folded in plaits $x$ by a pendulum-arm $b$, over a triangular arrangement of staves or rollers 21, over and down each side of which the plaits hang. On one side the plaits $x$ are engaged by a drum 34, which rotates in the opposite direction to the hands of a clock and carries the plaits down between itself and an endless traveling lattice or web 28. After passing the drum 34 the reversed plaits may be taken up, as shown at $x'$. As the swinging device moved the tension of the cloth between it and the drawing-roller was varied, and an intermittent slackness was produced.

The accompanying drawings illustrate my various improvements and will be hereinafter referred to, similar parts being indicated by similar characters of reference where they occur in the different figures.

Figure 6:
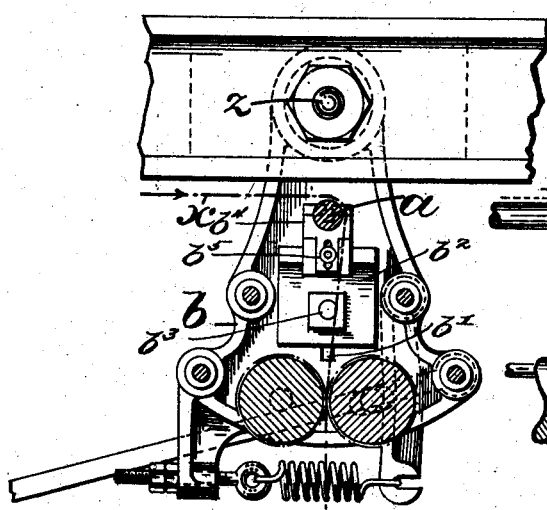
Figure 7:
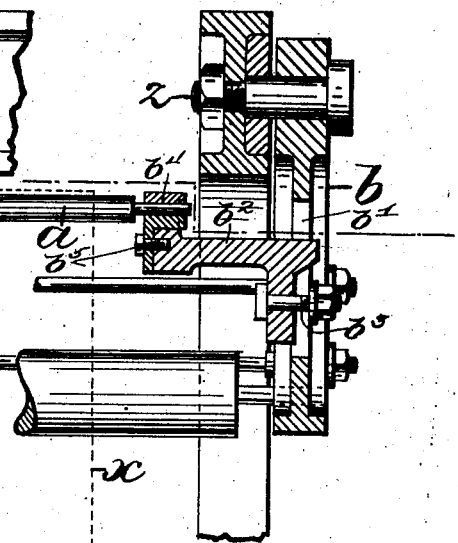
Figure 8:
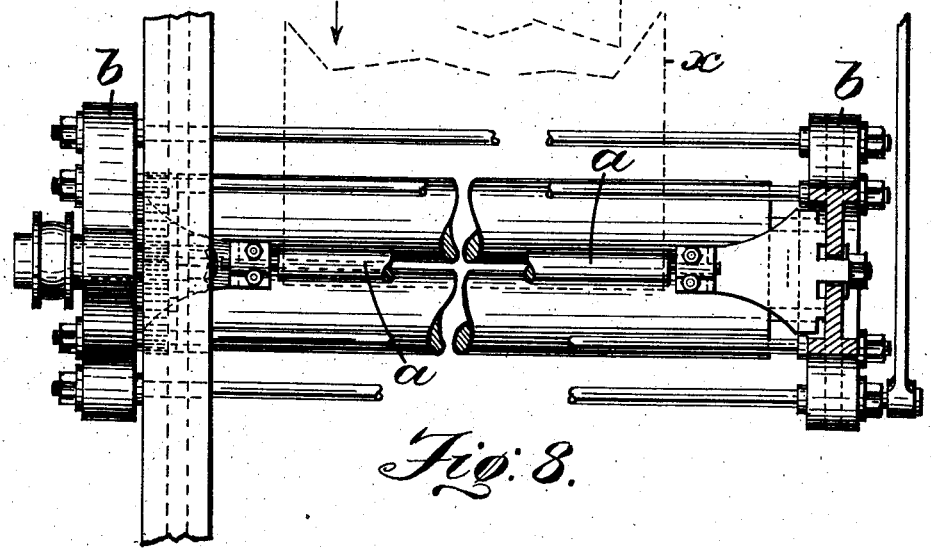
Figure 9:
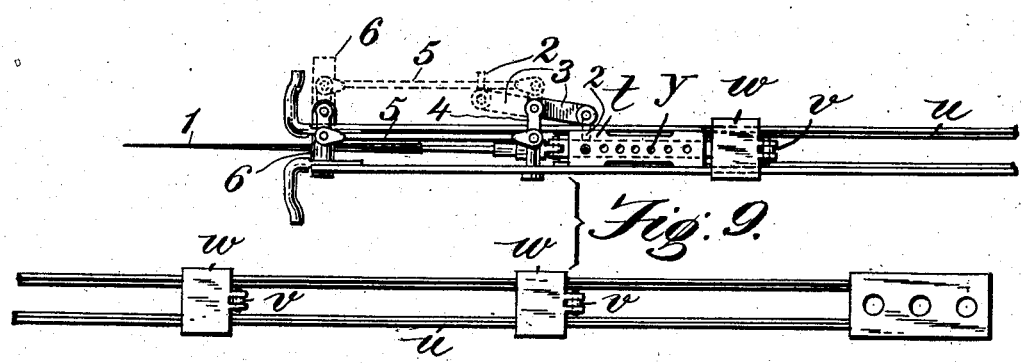
Figure 10:
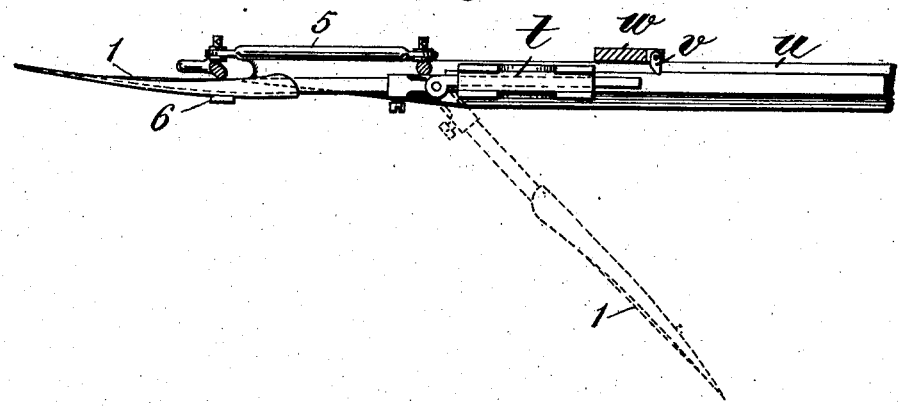

Figure 1 is a side view of the complete machine. Figs. 2, 3, 4, and 5 illustrate a roller for maintaining tension in the cloth and devices for driving it. Figs. 6, 7, and 8 are views of the pendulum-arm plaiting device and its accessories, and Figs. 9 and 10 are views of the improved knife.

According to this present invention and as clearly shown in Figs. 1, 6, 7, and 8 (the three latter figures being drawn to a large scale) the roller or stave $a$, over which the cloth passes to the plaiting or like device, is attached to the pendulum or swing-arm $b$ at a point below the pivots $z$. This roller or stave $a$ is mounted in bearings $b^4$, which are fixed to bracket $b^2$ by means of screws $b^5$, the brackets being fixed in the slots $b'$ of the pendulums $b$ by means of screws $b^3$, so that the position of the roller or stave $a$ may be varied or adjusted until a constant tension on the cloth during the movement of the swinging frame is obtained.

The cloth, as at $x'$, after being taken out of the folds for further cutting passes around and with a drum or roller $d$, (see Figs. 1, 2, 3, 4, and 5,) which is driven positively by belt or other gearing at a uniform speed, which is never in excess of the speed of the cloth on its way to the knife on the upper part of the machine or of the speed of the roller or rollers by which the cloth is being taken up after the cutting of the pile and is preferably less, so that a constant tension commensurate with its elasticity is exerted upon the cloth which is being delivered to the knife. As illustrated in Figs. 1 and 2, the roller $d$ may be driven from any convenient shaft or pulley in the machine by means of the belt $c$, and a pulley-driven friction-clutch $f$ or fast and loose pulleys or other equivalent device may be employed by means of which the positively-driven tension-roller may be thrown in and out of gear.

If desired and as illustrated by Figs. 3 and 4 of the drawings, speed-change wheels $g\ g'\ g^2$ may be interposed between the driven friction-clutch and the positively-driven tension-roller $d$, so that the latter may be set to run at any desired speed. Tension-staves $h$ may be provided, so that the cloth passes over, around, or between them on its way from the folds to the tension-roller $d$. Suitable devices may be employed to throw the friction-clutch $f$ or the like out of gear when the cloth passing along the top of the machine is slack or when the tension-roller $d$ has delivered more cloth than the taking-up rollers have taken up. Such a device, by means of which the slack in the cloth is taken up and the clutch may be operated, consists of a vertically-moving drop or jockey roller $j$, (see Figs. 1, 3, and 5,) under which the cloth $x$ passes and which is maintained in its highest position by the pull of the cloth when the latter is traveling normally through the machine. When the roller $j$ is in its highest position, a suitable rod $k$ or other part attached to or moving with it comes against and raises or maintains in its highest position one end of a two-armed lever $l$, the other end of which engages with and depresses the upper arm of a cranked lever $m$, the lower end of which operates a muff or the like and keeps the clutch in engagement, so that the tension-roller $d$ is positively driven.

Should the cloth at any time become slack—as, for example, upon the reversal of the machine—the drop-roller $j$ descends or falls in suitable guides or grooves in which it is placed in the frame of the machine, and the connected or engaged part of the lever $l$ moves with it or is moved downward by weights, springs, or equivalents. The lever $m$ correspondingly moves, a spring $n$ being employed to assist or insure this movement, if desired, and the clutch $f$ is withdrawn or made free, and the roller $d$ stops or ceases to be driven. A brake $o$ may be disposed to engage with a convenient part attached to the positively-driven tension-roller $d$ and is adapted to be operated through connections $p$ from the treadle or handle of the machine and to be "put on" when the machine is stopped and to be released when the machine is started. When the latter operation is effected, slack is first taken up in the cloth in the upper part of the machine and the jockey-roller $j$ is raised to its highest working position, so that it again raises the end of the lever $l$ and puts the clutch $f$ in action, so that the tension-roller $d$ is again positively driven.

Instead of positively driving the tension-roller in the manner hereinbefore described and from one of the ordinary or taking-up rollers it may be driven by or from the fabric $x$ itself after the latter has passed around the tension-roller $d$ and before it has arrived at the taking-up rollers. Such an arrangement is shown in Fig. 5, where the shaft on the drum or roller $r$, over which the cloth passes on its way to the jockey-roller $j$ is furnished with a toothed wheel which gears through other wheel or wheels $s$ with a wheel attached to the clutch $f$, so that the positive tension-roller $d$ is rotated as a consequence of the rotation of the drum $r$ upon the passage of the cloth. Other methods of transmitting the rotation of the cloth-driven roller to the positive tension-roller than by gear-wheels may be adopted, if desired, and the cloth-driven roller may be differently placed. The change-wheels illustrated in Figs. 3 and 4 may be used, if desired. When the positive tension-roller is driven from or by the cloth itself, the clutch $f$ may be dispensed with. The surface of the positively-driven tension-roller $d$ may be roughened, corrugated, fluted, or otherwise similarly formed to increase the grip of the cloth or its grip upon the cloth, or it may be covered or coated with a fabric or suitable frictional substance for the same purpose.

To obtain greater simplicity and lightness in the knife and its accessories, the rack usually attached to or combined with the handle is dispensed with, and the pawl which has hitherto been secured to the carriage or slide is now attached to a bridge-piece which extends across the handle or is otherwise so mounted that it falls into the path of the carriage. A knife so fitted is shown in Figs. 9 and 10, respectively in plan and sectional side elevation, $t$ indicating the slide or carriage carrying the knife and $u$ the handle. As will be seen, a pawl $v$ is mounted upon a bridge-piece $w$ on the handle in such a manner that it falls into the path of the slide $t$, which is provided with means—as, for example, the holes $y$—for engagement with the pawl $v$ when the knife is released and slides into the handle, or the pawl may engage with the end of other part of the carriage. More than one such bridge-piece and pawl may be employed in connection with the handle. The remainder of this knife is of the usual construction. It is provided with a blade 1, hinged to the slide $t$, which slide is normally locked in place in the handle $u$ by a pin 2, pivoted to an arm 3 of a lever mounted on a bracket 4 on the side of the handle. The other arm of this lever is attached by a connecting-rod 5 to a crank-arm secured to the pivoted plate 6. Should the knife accidentally penetrate the cloth, the cloth comes up against the plate 6 and moves it away from underneath the pivoted knife-blade 1. The blade is thus free to fall to the position shown in dotted lines in Fig. 10, and the operative parts connected to the pivoted plate 6 are moved to the positions shown by dotted lines in Fig. 9, and the pin 2 is withdrawn from the slide $t$, and the latter is free to move along the handle.

Having now described my invention, what I claim, and desire to secure by Letters Patent, is—

1. In a weft-pile-cutting machine, the combination of a positively-driven tension-roller, a clutch by means of which such roller may be thrown in or out of gear, and a jockey or drop roller actuated by the cloth and adapted to operate or permit the movement of the clutch, all substantially as hereinbefore described and as illustrated by the accompanying drawings.

2. In a weft-pile-cutting machine, the combination of a positively-driven tension-roller, a clutch by means of which such roller may be thrown in or out of gear, a jockey or drop roller actuated by the cloth and adapted to operate or permit the movement of the clutch and a brake, all constructed arranged and operated substantially as hereinbefore described and as illustrated by the accompanying drawings.

3. In a weft-pile-cutting machine, the combination of a positively-driven tension-roller, speed-change gearing therefor, a clutch by means of which the tension-roller may be thrown into or out of gear, and a jockey or drop roller bearing against the cloth and connected to operate said clutch.

4. In a weft-pile-cutting machine, a swing-arm or pendulum, means for feeding cloth thereto in a line below its axis of oscillation, a stave or roller mounted in slots in said arm beneath its axis, and over which stave the entering cloth is led, and additional rollers at the end of the arm through which the cloth passes, and by means of which the cloth is delivered in plaits.

5. A knife for use in a weft-pile-cutting machine, comprising a slide or carriage, a handle having a bridge thereon, a pawl pivoted on said bridge, and arranged to engage with the slide or carriage, as and for the purpose set forth.

In testimony whereof I have signed my name to this specification in the presence of two subscribing witnesses.

OSCAR DREY.

Witnesses:
 MALCOLM SMETHURST,
 WM. WARREN.